March 3, 1964 R. E. NANCE 3,122,818
PIPE-END DEBURRING TOOL
Filed May 27, 1960 2 Sheets-Sheet 1

AXIS OF ROTATION

INVENTOR
RUSSELL E. NANCE
By Donald G. Dalton
Attorney

March 3, 1964
R. E. NANCE
3,122,818
PIPE-END DEBURRING TOOL
Filed May 27, 1960
2 Sheets-Sheet 2
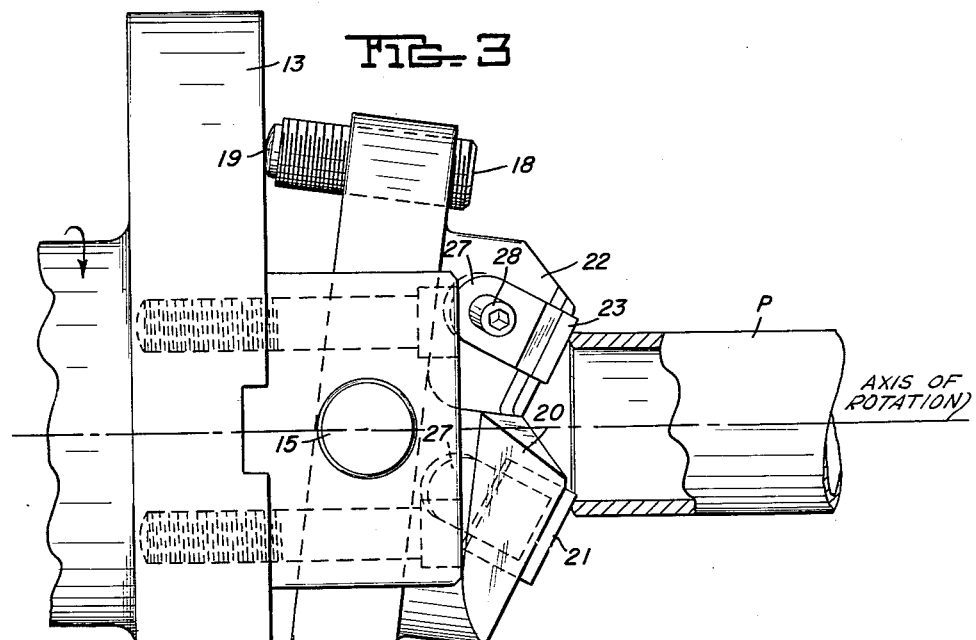
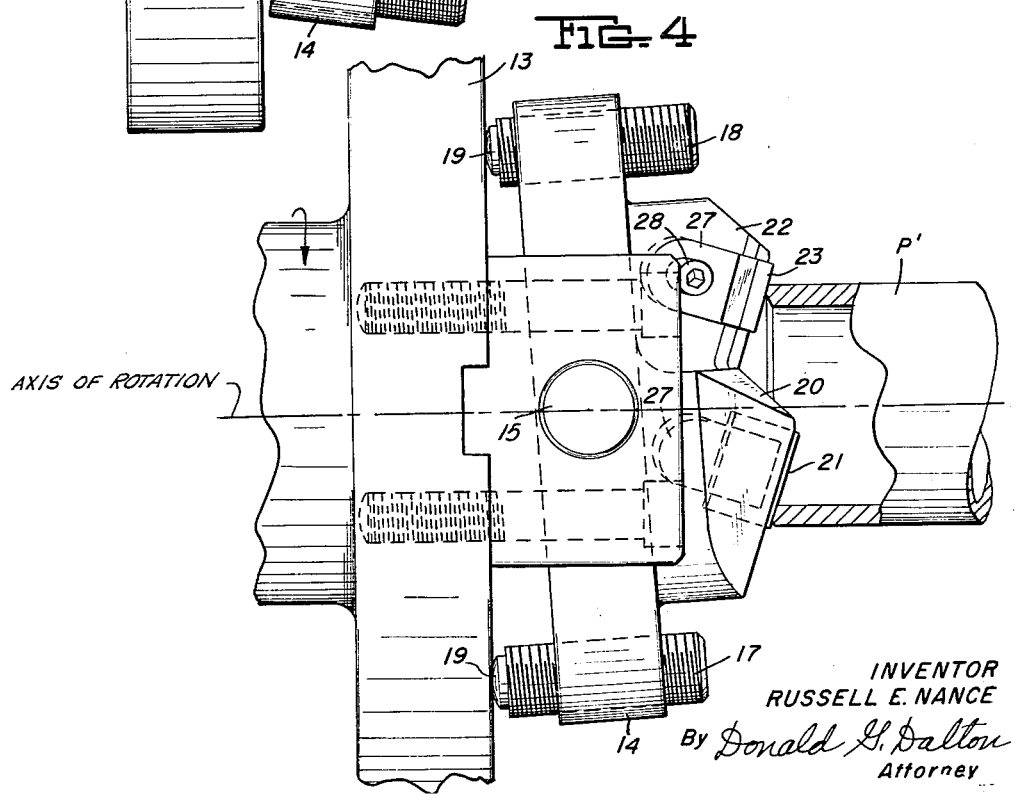
INVENTOR
RUSSELL E. NANCE
By Donald G. Dalton
Attorney

3,122,818
PIPE-END DEBURRING TOOL
Russell E. Nance, Chesterton, Ind., assignor to United States Steel Corporation, a corporation of New Jersey
Filed May 27, 1960, Ser. No. 32,358
10 Claims. (Cl. 29—105)

This invention relates to an improved tool head for mounting cutting tools used for removing burrs from pipe ends.

After a saw or the like cuts a length of pipe, rough burrs remain on both the inside and outside edges of the cut surface. The usual practice is to remove such burrs with appropriate cutting tools mounted in a lathe. Tools for removing burrs from both edges can be mounted in the same tool head, whereby only a single de-burring operation is necessary for each pipe end. However, previous arrangements of this type with which I am familiar have had disadvantages. They require an excessive number of parts to support both inside and outside tools, yet allow adjustment for different sizes of pipe. Consequently they are subject to a great amount of wear, which leads to tool breakage. Also they are awkward to adjust for different sizes, and require that the cutting tools themselves be adjusted in their clamping means.

An object of the present invention is to provide an improved tool head which overcomes the foregoing disadvantages, that is, a tool head which mounts tools for de-burring both the inside and outside edges of a pipe end, yet is of simple construction and easy to adjust.

A further object is to provide a tool head which affords positive support for both inside and outside de-burring tools, yet employs a minimum number of parts and is adjusted simply by changing the angle of cant of its base.

A more specific object is to provide a tool head which includes a trunnion supported base and cutting tools clamped to this base, and wherein adjustment is obtained by canting the base about its trunnions without disturbing the tool clamps.

In accomplishing these and other objects of the invention, I have provided improved details of structure, a preferred form of which is shown in the accompanying drawings, in which:

FIGURE 3 is a side elevational view of the tool head adjusted for de-burring the edge of a small diameter pipe; and FIGURE 4 is a side elevational view of the tool head adjusted for de-burring the edges of a larger diameter pipe.

Figure 1:
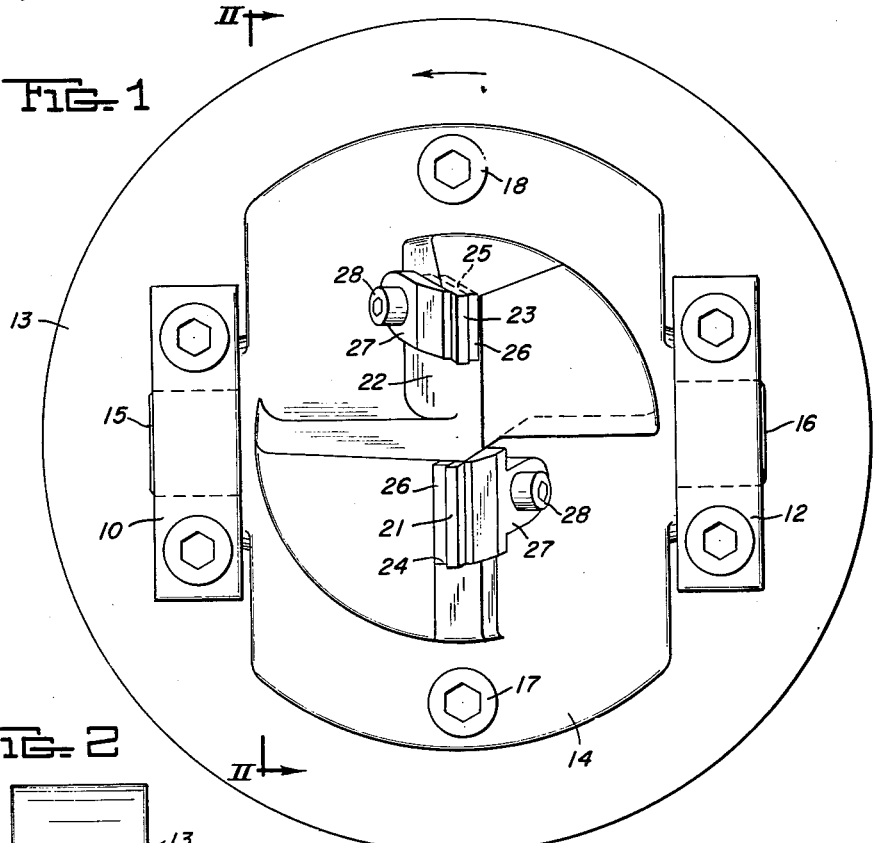
FIGURE 1 is an end elevational view of a tool head constructed in accordance with my invention.
Figure 2:
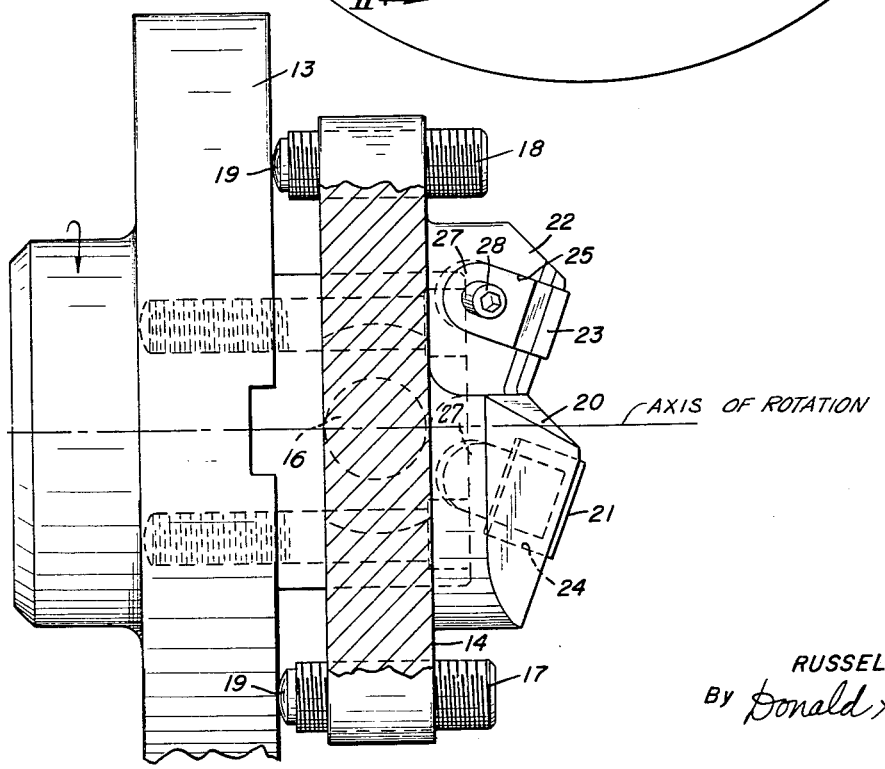
FIGURE 2 is a section on line II—II of FIGURE 1.

As shown in FIGURE 1, my tool head includes a pair of spaced-apart aligned trunnion blocks or bearings 10 and 12 which are rigidly fastened to a rotatable face plate 13 of a conventional lathe, not otherwise shown. My tool head also includes a base 14 which carries opposed trunnions 15 and 16 pivoted in the respective trunnion blocks 10 and 12 on an axis perpendicular to the axis of rotation. Opposed adjustment screws 17 and 18 are threadedly engaged with the base 90° removed from the trunnions. These adjustment screws have rounded tips 19 which bear against the face plate 13 for controlling the angle of cant of base 14 with respect to the face plate.

The outer face of base 14 carries an integral outwardly projecting mounting 20 for an inside cutting tool 21 and another opposed integral outwardly projecting mounting 22 for an outside cutting tool 23. In the illustration the parts rotate counterclockwise as viewed in FIGURE 1. The mountings 20 and 22 have recesses 24 and 25 open in the direction of rotation for receiving the respective cutting tools 21 and 23. The tools are held in the recesses with shims 26 fitted into the recesses and clamp plates 27 fixed to the mountings, as with cap screws 28. Thus each mounting furnishes a solid backing and positive support for its respective cutting tool.

The cutting edges of the two tools 21 and 23 lie in the same plane as the center lines of the adjustment screws 17 and 18. The inside tool 21 is located somewhat closer to the axis of rotation of the face plate 13 and base 14 than the outside tool 23. The inside tool can have a longer cutting edge, as illustrated, for larger pipe sizes (for example pipes of 2 to 3½ inches outside diameter), but for smaller pipe sizes the cutting edges can be of the same length. The cutting edges have a rake angle of about 10° to 25° with respect to base 14. Preferably the cutting tools are of a hard carbide, such as tungsten carbide or silicon carbide.

As shown in FIGURES 3 and 4, the cutting edge of the inside tool 21 engages the inner circumference of the end of a pipe P or P', while the cutting edge of the outside tool 23 engages the outer circumference. On rotation of the tool head, these cutting tools remove burrs from the respective edges. To adjust the tool head for smaller pipe sizes, it is only necessary to turn the adjustment screw 17 outwardly and the adjustment screw 18 inwardly, as shown in FIGURE 3. This action cants base 14 in a direction to bring the cutting edge of the outside tool 23 closer to the axis of rotation of the face plate 13. To adjust the tool head for larger pipe sizes, it is only necessary to turn the adjustment screws in the opposite direction, as shown in FIGURE 4. This action cants base 14 in a direction to bring the cutting edge of the outside tool farther from the axis. The cutting edge of the inside tool 21 is of a length that it engages the inside edge of the pipe in either extreme position.

From the foregoing description, it is seen that the present invention provides a tool mounting of simple construction and having a minimum number of parts. Adjustments for different sizes of pipe are effected very simply by turning two adjustment screws, and there is no need for disturbing the clamps which hold the cutting tools. These tools are positively clamped against integral mountings on the base, so that there is no thrust load against the clamps.

While I have shown and described only a single embodiment of my invention, it is apparent that modifications may arise. Therefore, I do not wish to be limited to the disclosure set forth but only by the scope of the appended claims.

I claim:

1. A tool head for mounting cutting tools in positions to engage both the inside and outside circumferential edges of a pipe end, said tool head comprising bearing means adapted to be fixed to a rotatable support, a base pivoted to said bearing means on an axis perpendicular to the axis of rotation and radial with respect thereto, adjustable means engaging said base and the support for pivoting the base about said bearing means and thus varying its angle of cant with respect to the support, and tool mounting means projecting from said base on opposite sides of the axis of rotation and on opposite sides of the axis of pivoting and adapted to carry inside and outside cutting tools, whereby canting said base to different angles changes the position of the tools for different sizes of pipe.

2. A tool head for mounting cutting tools in positions to engage both the inside and outside circumferential edges of a pipe end, said tool head comprising a pair of spaced-apart aligned trunnion blocks adapted to be fixed to a rotatable support, a base, trunnions carried by said base and pivoted in said blocks on an axis perpendicular to the axis of rotation and radial with respect thereto, a pair of opposed adjustment screws threadedly engaged with said base 90° removed from said trunnions and adapted to bear against the support for pivoting the base about said trunnions and thus varying its angle of cant with respect to the support, and tool mounting means projecting from said base on opposite sides of the axis of rotation and on opposite sides of the axis of pivoting and adapted to carry inside and outside cutting tools, whereby canting said base to different angles changes the position of the tools for different sizes of pipe.

3. A tool head for mounting cutting tools in positions to engage both the inside and outside circumferential edges of a pipe end, said tool head comprising bearing means adapted to be fixed to a rotatable support, a base pivoted to said bearing means on an axis perpendicular to the axis of rotation and radial with respect thereto, adjustable means engaging said base and the support for pivoting the base about said bearing means and thus varying its angle of cant with respect to the support, and a pair of integral outwardly projecting mountings carried by said base for inside and outside cutting tools respectively, said mountings having recesses each open in the direction of rotation for receiving the cutting tools and enabling the mountings to furnish positive support for the tools, said mountings being situated on opposite sides of the axis of rotation and on opposite sides of the axis of pivoting, whereby canting said base to different angles changes the position of the tools for different sizes of pipe without disturbing the tools in said mountings.

4. A tool head for mounting cutting tools in positions to engage both the inside and outside circumferential edges of a pipe end, said tool head comprising a pair of spaced-apart aligned trunnion blocks adapted to be fixed to a rotatable support, a base, trunnions carried by said base and pivoted in said blocks on an axis perpendicular to the axis of rotation and radial with respect thereto, a pair of opposed adjustment screws threadedly engaged with said base 90° removed from said trunnions and adapted to bear against the support for pivoting the base about said trunnions and thus varying its angle of cant with respect to the support, and a pair of integral outwardly projecting mountings carried by said base for inside and outside cutting tools respectively, said mountings having recesses each open in the direction of rotation for receiving the cutting tools and enabling the mountings to furnish positive support for the tools, said mountings being situated on opposite sides of the axis of rotation and on opposite sides of the axis of pivoting, whereby canting said base to different angles changes the position of the tools for different sizes of pipe without disturbing the tools in said mountings.

5. The combination, with a support which is rotatable about an axis, of a tool head comprising a base pivoted with respect to said support on an axis perpendicular to the axis of rotation and radial with respect thereto, adjustable means for varying the angle of cant of said base with respect to said support, and inside and outside cutting tools mounted on said base and having respective cutting edges, said tools being situated on opposite sides of the axis of rotation and on opposite sides of the axis of pivoting and in a relation that, in a given plane which is perpendicular to the axis of rotation and intersects both said cutting edges, the points of intersection on both cutting edges are spaced radially from the axis of rotation, but the point of intersection on the cutting edge of the inside tool is closer to the axis of rotation than the point of intersection on the cutting edge of the outside tool, to position said cutting edges where they can engage the inside and outside circumferential edges respectively of a pipe end, and whereby canting said base to different angles changes the position of said tools for different sizes of pipe.

6. The combination, with a support which is rotatable about an axis, of a tool head comprising bearing means fixed to said support, a base pivoted to said bearing means on an axis perpendicular to the axis of rotation and radial with respect thereto, adjustable means engaging said base and said support for pivoting said base about said bearing means and thus varying its angle of cant with respect to said support, tool mounting means projecting from said base, and inside and outside cutting tools positively supported in said tool mounting means and having respective cutting edges, said tools being situated on opposite sides of the axis of rotation and on opposite sides of the axis of pivoting and in a relation that, in a given plane which is perpendicular to the axis of rotation and intersects both said cutting edges, the points of intersection on both cutting edges are spaced radially from the axis of rotation, but the point of intersection on the cutting edge of the inside tool is closer to the axis of rotation than the point of intersection on the cutting edge of the outside tool, to position said cutting edges where they can engage the inside and outside circumferential edges respectively of a pipe end, and whereby canting said base to different angles changes the position of said tools for different sizes of pipe.

7. A combination as defined in claim 6 in which said tool mounting means have recesses each open in the direction of rotation, and said cutting tools are received and positively fixed in said recesses with the mounting means furnishing solid backings for the cutting tools.

8. The combination, with a support which is rotatable about an axis, of a tool head comprising a pair of spaced-apart aligned trunnion blocks fixed to said support, a base, trunnions extending from said base and pivoting said base to said blocks on an axis perpendicular to the axis of rotation and radial with respect thereto, a pair of opposed adjustment screws threadedly engaged with said base 90° removed from said trunnions and bearing against said support for pivoting said base about said trunnions and thus varying its angle of cant with respect to said support, and inside and outside cutting tools mounted on said base and having respective cutting edges, said tools being situated on opposite sides of the axis of rotation and on opposite sides of the axis of pivoting and in a relation that, in a given plane which is perpendicular to the axis of rotation and intersects both said cutting edges, the points of intersection on both cutting edges are spaced radially from the axis of rotation, but the point of intersection on the cutting edge of the inside tool is closer to the axis of rotation than the point of intersection on the cutting edge of the outside tool, to position said cutting edges where they can engage the inside and outside circumferential edges respectively of a pipe end, and whereby canting said base to different angles changes the position of said tools for different sizes of pipe.

9. A tool head comprising bearing means, a base mounted on said bearing means for pivotal movement about an axis, means for pivotally adjusting said base about said axis and adapted to fix said base in the position to which it is adjusted, and a pair of mountings projecting from said base on opposite sides of said axis for receiving inside and outside cutting tools, said tool head having a central axis which intersects the pivotal axis and extends at right angles thereto intermediate said mountings, said mountings being situated in a relation that, in a given plane which is perpendicular to said central axis and intersects the cutting edges of tools carried by both mountings, the points of intersection of both are spaced from said central axis, but the point of intersection on the cutting edge of the inside tool is closer to said central axis than the point of intersection on the cutting edge of the outside tool, to position the cutting edges where they can engage the inside and outside circumferential edges respectively of a pipe end, and whereby canting said base to different angles changes the position of said mountings for different sizes of pipe.

10. A tool head comprising bearing means, a base mounted on said bearing means for pivotal movement about an axis, means for pivotally adjusting said base about said axis and adapted to fix said base in the position to which it is adjusted, and inside and outside cutting tools mounted on said base and having respective cutting edges, said tool head having a central axis which intersects the pivotal axis and extends at right angles thereto intermediate said tools, said tools being situated in a relation that, in a given plane which is perpendicular to said central axis and intersects both of said cutting edges, the points of intersection on both cutting edges are spaced radially from said central axis, but the point of intersection on the cutting edge of the inside tool is closer to said central axis than the point of intersection on the cutting edge of the outside tool to position said cutting edges where they can engage the inside and outside circumferential edges respectively of a pipe end, and whereby canting said base to different angles changes the position of said tools for different sizes of pipe.

References Cited in the file of this patent

UNITED STATES PATENTS

| | | |
|---|---|---|
| 707,472 | Welter | Aug. 19, 1902 |
| 1,706,512 | Baines | Mar. 26, 1929 |
| 1,935,493 | Wellington | Nov. 14, 1933 |
| 2,269,320 | Rosborough | Jan. 6, 1942 |
| 2,325,334 | Meeson | July 27, 1943 |
| 2,369,875 | Wanelik | Feb. 20, 1945 |
| 2,645,000 | Finch | July 14, 1953 |
| 2,837,001 | Mulvaney | June 3, 1958 |
| 2,841,039 | Stastny | July 1, 1958 |
| 2,846,757 | Klosterkemper | Aug. 12, 1958 |
| 2,889,721 | Coleman | June 9, 1959 |
| 2,893,110 | Gibson | July 7, 1959 |

FOREIGN PATENTS

| | | |
|---|---|---|
| 144,902 | Germany | May 3, 1901 |
| 106,593 | Great Britain | May 31, 1917 |